No. 707,422. Patented Aug. 19, 1902.
F. E. IVES.
PHOTOGRAPHIC ATTACHMENT FOR OPTICAL INSTRUMENTS.
(Application filed June 30, 1902.)
(No Model.) 4 Sheets—Sheet 4.
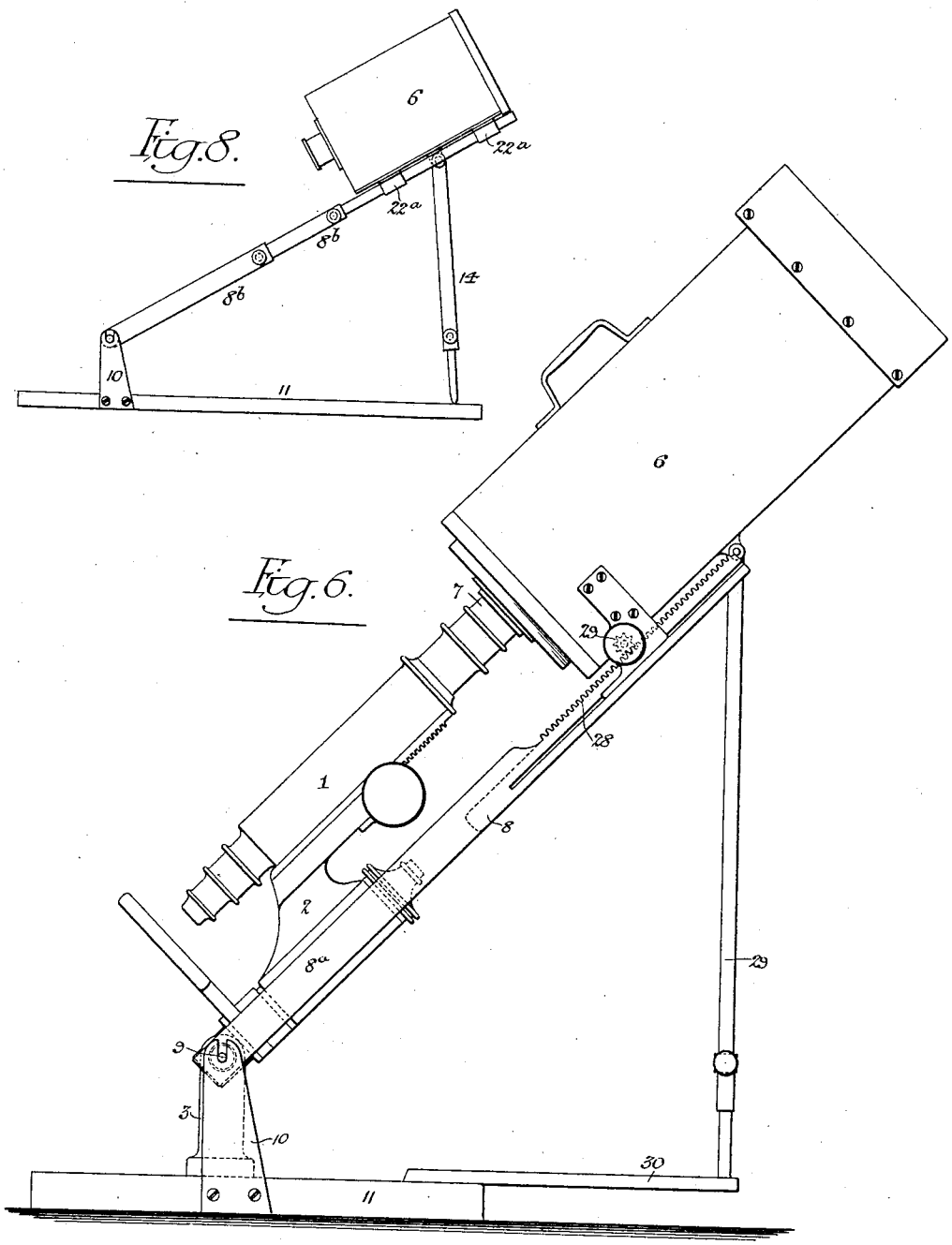

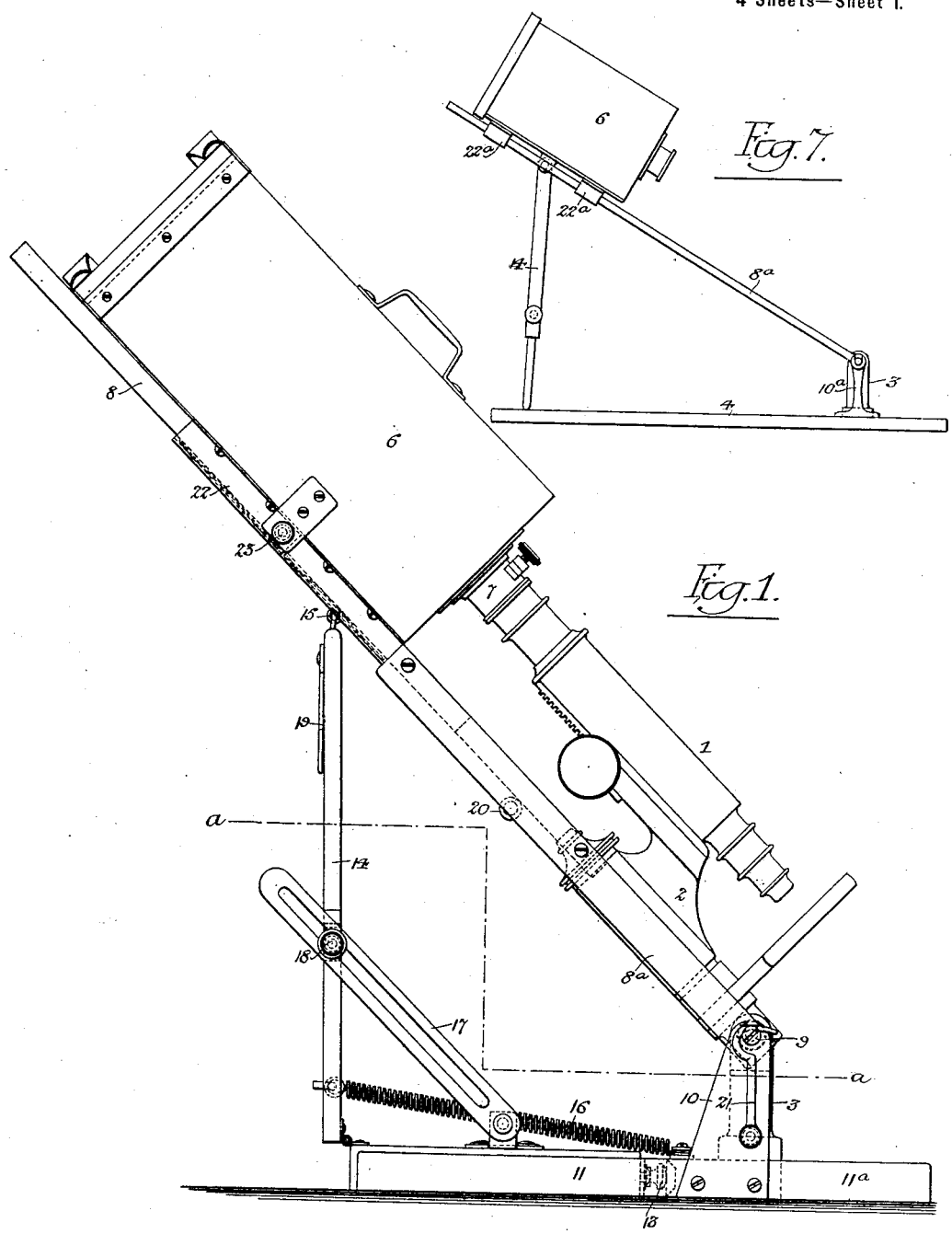

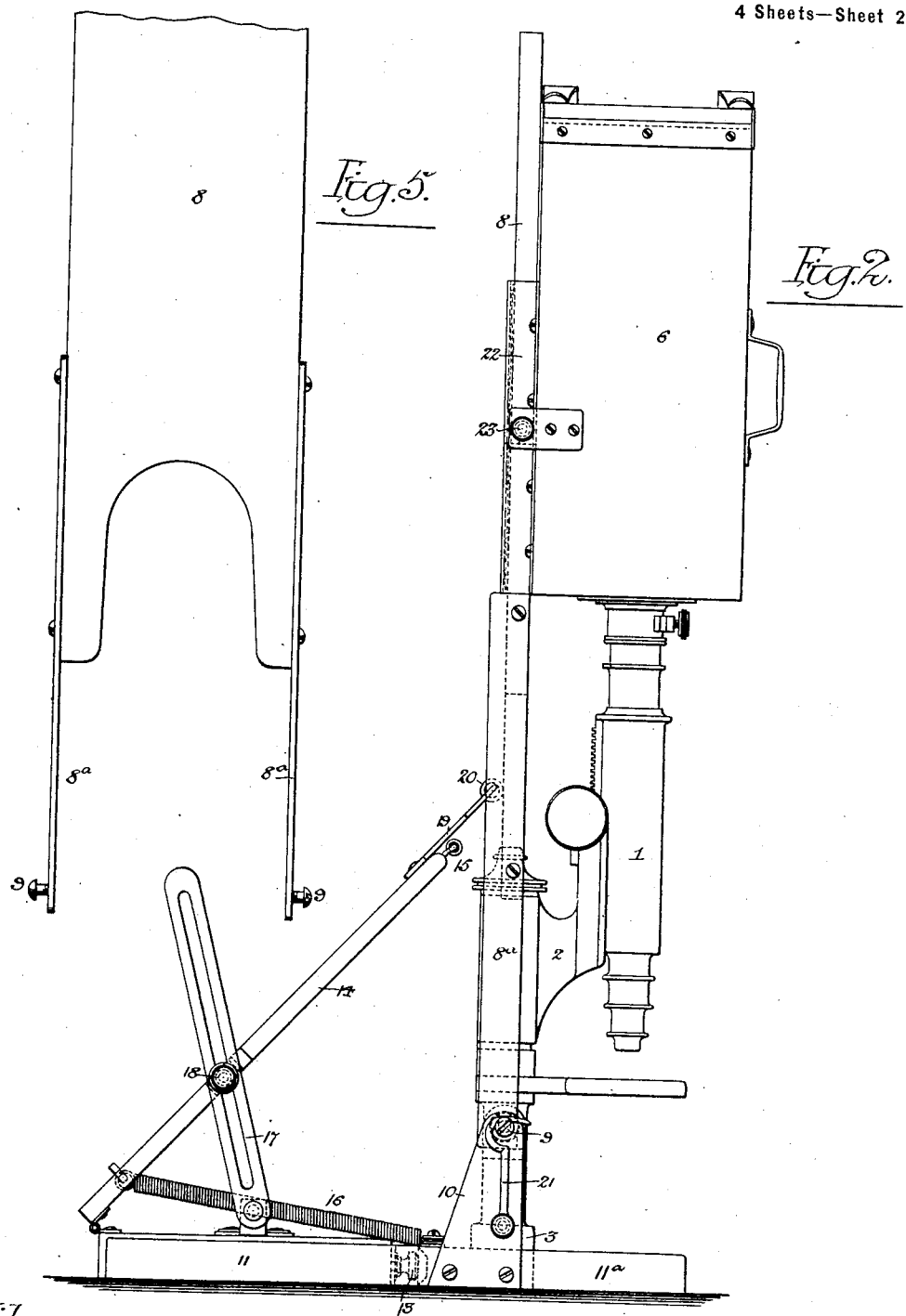

UNITED STATES PATENT OFFICE.

FREDERIC E. IVES, OF PHILADELPHIA, PENNSYLVANIA.

PHOTOGRAPHIC ATTACHMENT FOR OPTICAL INSTRUMENTS.

SPECIFICATION forming part of Letters Patent No. 707,422, dated August 19, 1902.

Application filed June 30, 1902. Serial No. 113,733. (No model.)

*To all whom it may concern:*

Be it known that I, FREDERIC E. IVES, a citizen of the United States, residing in Philadelphia, Pennsylvania, have invented certain Improvements in Photographic Attachments for Optical Instruments, of which the following is a specification.

The object of my invention is to facilitate the production of photomicrographs or photographs of the images seen in the eyepieces of other optical instruments—such as spectroscopes, polariscopes, &c.—and also to secure the same optical conditions for photography as for vision, my aim being to provide for reproducing whatever the eye may see at any time in the ordinary use of the microscope or other optical instrument without disturbing the position or adjustment of the latter and at the same time obtain the same nominal amplification without measurement and the same definition without refocusing. This object I attain in the manner hereinafter set forth, reference being had to the accompanying drawings, in which—

Figure 4:
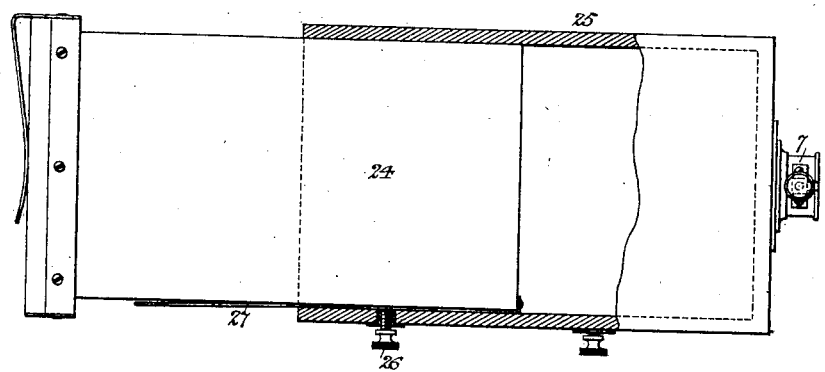
Figure 5:
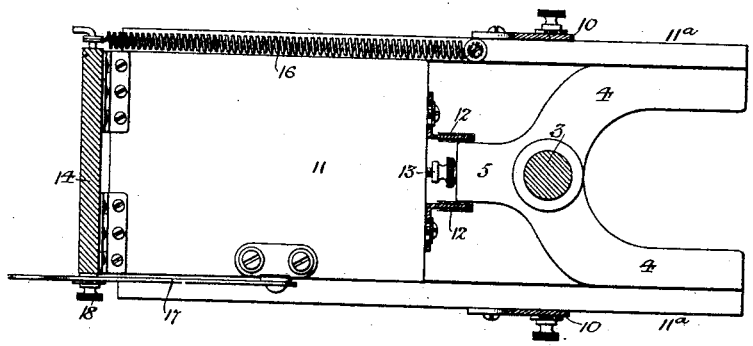

Figure 1 is a view showing the application of my photographic attachment to an ordinary form of microscope, the latter being shown as adjusted to an inclined position. Fig. 2 is a similar view showing the application of the attachment to the microscope when the same is adjusted to a vertical position. Fig. 3 is a sectional plan view on the line $a\ a$, Fig. 1. Fig. 4 is a sectional plan view of the camera, illustrating the construction which it is preferred to employ when a camera having an adjustable extension is desired. Fig. 5 is a detached view of part of the camera-carrying element of the attachment, and Figs. 6, 7, and 8 are views illustrating certain modifications in the construction of the camera attachment.

An ordinary form of microscope is illustrated at 1 in the drawings, the tube of the microscope being carried by an arm 2, attached to a pillar and stage, which is pivotally mounted upon a post 3, projecting upwardly from a base 4, of horseshoe form, and having a rearwardly-extending projection 5, as shown in Fig. 3.

The camera consists of a box 6, having at the rear end any ordinary form of plate-holder and provided at the front end with a fixed-focus lens 7, preferably a lens of ten-inch focus, so that the amplification of the image in the photograph will be exactly what would be calculated for the microscope-image, the usual microscopic rule being to assume an image distance of ten inches.

Another reason for using the camera having a fixed focus of ten inches is to render the defininition in the photograph equal to that seen in the microscope, which would not usually be the case if the camera were not provided with a lens focusing for parallel rays, because the alteration in the focus which would then be necessary involves a departure from the conditions assumed as a basis for calculating the best construction for objectives and eyepieces. A camera thus constructed when applied to the eyepiece of the microscope will reproduce the image seen in the microscope correct in definition and amplification, provided the microscope has been focused with an emmetropic eye and that the photograph is made by the action of the same light-rays that form the visible image. If the microscope-images are focused by a short-sighted or by an abnormally-far-sighted eye, a slight readjustment of the focus of the microscope may be necessary to make the image perfectly sharp upon the ground glass of the camera; but to avoid this possibility the myopic or hypermetropic microscopist may focus the microscope through a glass which corrects the eye for parallel rays.

In order to provide for the ready application of the camera to the microscope without disturbing the latter and for the equally ready removal of the camera from the microscope when the photographic exposure has been made, I mount the camera-box 6 so that it can slide longitudinally upon a frame 8 or upon suitable arms acting as a substitute for said frame, the latter being pivoted concentrically with the pivot of the microscope. Hence the axis of the camera can be readily alined with that of the microscope, and the camera can be longitudinally adjusted upon its carrier to accord with any longitudinal adjustment of the microscope necessary for the proper focusing of the same.

In the present instance the arms $8^a$ of the supporting-frame 8, which straddle the body 2 of the microscope, have pins 9, which can be dropped into slots at the upper ends of plates 10, projecting upwardly from a base structure 11, which has projecting arms 11ª for bearing against the sides of the horseshoe-base 4 of the microscope, so as to insure the proper lateral adjustment of the camera-supporting frame in respect to the same, the rear portion 11 of the base structure having laterally-adjustable arms 12 for engaging the rearward projection 5 of the microscope-base and also having a forwardly-projecting set-screw 13, which by contact with said rearward projection 5 will so govern the longitudinal adjustment of the base structure 11 in respect to the microscope-base as to insure the proper alinement of the pivot of the microscope and the sockets which receive the pivot-pins 9 of the camera-carrying frame.

In order to steady the camera-support 8 in any position of angular adjustment which it may assume, I use a strut 14, pivoted to the base 11, and having at the upper end an anti-friction-roller 15, which runs in contact with the under face of the frame 8, as shown in Fig. 1, said strut being acted upon by a coiled spring 16, so that its roller has a constant bearing upon the under side of the frame 8 in any position of angular adjustment assumed by said frame, a slotted brace 17 and clamping-screw 18 serving to lock the strut 14 in position when the angular position of the camera has been finally determined.

When the microscope and camera are adjusted to a vertical position, the camera-supporting frame can be locked in such vertical position by engagement of a pivoted hook 19 on the strut with an eye 20 on the under side of the supporting-frame 8, as shown in Fig. 2.

Similar hooks 2 may be employed for retaining the pivot-pins 9 of the camera-frame within the sockets of the supporting-plates 10.

Longitudinal adjustment of the camera upon the supporting-frame 8 may be effected in any suitable manner. For instance, in Fig. 1 the camera has guides 22 embracing the edges of the frame and is provided with a clamping-screw 23, whereby it may be locked to said frame in any position of longitudinal adjustment thereon.

If a camera with adjustable extension is desired, I prefer to adopt the construction shown in Fig. 4, in which one box 24 slides within another box 25, a clamping-screw 26 on the latter engaging with a spring-plate 27 on the box 24, so as to secure the latter in position after adjustment.

In that form of the invention shown in Fig. 5 a rack-and-pinion adjusting device 28 29 is employed for effecting longitudinal adjustment of the camera 6 upon the supporting-frame 8, and a telescopic strut 29, pivoted to the camera, bears at its lower end against a rearward extension 30 of the base structure 11 of the attachment. Either of these constructions, adapted for use with the ordinary horseshoe-base microscope, may, after once being adjusted to the inclination and extension of the microscope, be instantly removed as a whole by a single rectilinear movement, effected by one hand, and when replaced with equal facility will be ready for instant use without readjustment, if meanwhile the inclination or extension of the microscope has not been altered.

It is obvious that different forms of microscope-bases may call for modifications in the shape or construction of the base of the attachment or in the support for the pivot-pins which carry the camera. For instance, these pivot-supports might in some cases project from the base of the microscope itself, as at 10ª in Fig. 7, or from a base upon which the microscope rests in such position as not to interfere with the comfortable use of the microscope when the camera is not attached thereto, and microscope-stands which have no pivots and are therefore always used in the upright position require neither pivots nor strut for the camera-support, but only a simple standard. It is also obvious that one may choose to make the amplification in the photograph different from that in the microscope—say one-half or one and one-half times linear—in which case a camera having a five-inch focus or one having a fifteen-inch focus could be substituted for the camera having a ten-inch focus, still utilizing other features of my invention, or the camera may have an adjustable extension, as in Fig. 4, with lenses of various foci for various amplifications, or some of the features of my invention may be used for photography without the eyepiece or camera-lens. It should also be understood that while the construction described is preferable the same principles may be embodied and the same results attained with some modifications of construction. For example, the camera need not necessarily be movable as a rigid whole, and the extension-arms, instead of being attached to the rigid base carrying the camera, may pass through the guides 22ª, attached to the bottom or sides of the camera or its base, which is then movable by sliding along the arms, as shown in Fig. 7, or the extension-arms may, as shown at 8ᵇ in Fig. 8, be telescopic instead of sliding through guides on the camera or attaching to a separate base upon which the camera is movable.

The construction which I have shown in Fig. 1 has the advantage, among others, of providing a fixed central position for the attachment or bearing of a supporting-strut, which is the most convenient means for securing a positive and rigid, though adjustable, support for the camera, whereby all danger of vibration is overcome.

Having thus described my invention, I claim and desire to secure by Letters Patent—

1. The combination of an optical instrument having an eyepiece, with a camera complete with lens having a fixed focus similar to the image distance of the instrument, whereby the image seen in the eyepiece is reproduced without alteration of focus, definition or amplification, substantially as specified.

2. A camera focused for parallel rays and movable to and fro in the line of its optical axis, in combination with a support whereby said camera is mounted in position for use in connection with an optical instrument, substantially as specified.

3. A camera focused for parallel rays and movable to and fro as a rigid whole in the line of its optical axis, in combination with a support whereby said camera is mounted in position for use in connection with an optical instrument, substantially as specified.

4. A camera focused for parallel rays and movable to and fro in the line of its optical axis, in combination with a support whereby said camera is mounted in position for use in connection with an optical instrument, said support having as an element a base constructed to engage the base of said instrument, substantially as specified.

5. A camera focused for parallel rays and movable to and fro in the line of its optical axis, in combination with a support whereby the camera is mounted in position for use in connection with an optical instrument, one of the elements of said support being a strut whereby the support is braced and stiffened when the camera is in position for use, substantially as specified.

6. A camera focused for parallel rays and movable to and fro in the line of its optical axis, in combination with a support whereby the camera is mounted in position for use in connection with an optical instrument, one of the elements of said support being a pivoted strut whereby the support is braced and stiffened when the camera is in position for use, substantially as specified.

7. A camera focused for parallel rays and movable to and fro in the line of its optical axis, in combination with a support whereby the camera is mounted in position for use in connection with an optical instrument, elements of said support being a base constructed for engagement with the base of said instrument, and a strut whereby the support is braced and stiffened when the camera is adjusted in position for use, substantially as described.

8. A camera focused for parallel rays and movable to and fro in the line of its optical axis, in combination with a support whereby the camera is mounted in position for use in connection with an optical instrument, elements of said support being a base constructed for engagement with the base of said instrument, and a pivoted strut whereby the support is braced and stiffened when the camera is adjusted in position for use, substantially as specified.

9. A camera focused for parallel rays and movable to and fro in the line of its optical axis, and a support whereby said camera is mounted in position for use in connection with an optical instrument, elements of said support being a base engaging the base of the instrument, and a strut interposed between said base and that portion of the support upon which the camera is mounted, substantially as specified.

10. A camera focused for parallel rays and movable to and fro in the line of its optical axis, whereby said camera is mounted in position for use in connection with an optical instrument, elements of said support being a base engaging the base of the instrument, and a pivoted strut interposed between said base and that portion of the support upon which the camera is mounted, substantially as specified.

11. The combination of a pivotally-mounted optical instrument, with a camera movable in the line of its optical axis, and a pivoted and swinging support for said camera having its pivotal axis concentric with the pivotal axis of the instrument, substantially as specified.

12. The combination of a pivotally-mounted optical instrument, with a camera focused for parallel rays and movable in the line of its optical axis, and a pivoted and swinging support for said camera having its pivotal axis concentric with the pivotal axis of the instrument, substantially as specified.

13. The combination of a pivotally-mounted optical instrument, with a camera focused for parallel rays and movable as a rigid whole in the line of its optical axis, and a pivoted and swinging support for said camera having its pivotal axis concentric with the pivotal axis of the instrument, substantially as specified.

14. The combination of an optical instrument having a pivotal mounting, with a camera movable in the line of its optical axis, and a support for said camera comprising a base engaging the base of the instrument, and a camera-carrying element pivotally mounted upon said base in line with the pivotal axis of the instrument, substantially as specified.

15. The combination of an optical instrument having a pivotal mounting, with a camera focused for parallel rays and movable as a rigid whole in the line of its optical axis, and a support for said camera, comprising a base engaging the base of the instrument, and a camera-carrying element pivotally mounted upon said base in line with the pivotal axis of the instrument, substantially as specified.

16. The combination of an optical instrument having a pivotal mounting, with a camera movable in the line of its optical axis, a pivoted and swinging support for said camera having its pivotal axis concentric with that of the instrument, and a strut for bracing said pivotal camera-support when the camera is adjusted for use, substantially as specified.

17. The combination of an optical instrument having a pivotal mounting, with a camera focused for parallel rays and movable as a rigid whole in the line of its optical axis, a pivoted and swinging support for said camera having its pivotal axis concentric with that of the instrument and a strut for bracing said pivotal camera-support when the camera is adjusted for use, substantially as specified.

18. The combination of an optical instrument having a pivotal mounting, with a camera movable in the line of its optical axis, a pivoted and swinging support for said camera having its pivotal axis concentric with that of the instrument and a pivotal strut for bracing said pivotal camera-support when the camera is adjusted for use, substantially as specified.

19. The combination of an optical instrument having a pivotal mounting, with a camera focused for parallel rays and movable as a rigid whole in the line of its optical axis, a pivoted and swinging support for said camera having its pivotal axis concentric with that of the instrument, and a pivoted strut for bracing said pivotal camera-support when the camera is adjusted for use, substantially as specified.

20. The combination of an optical instrument having a pivotal mounting, with a camera movable in the line of its optical axis, and a support for said camera comprising a base constructed to engage the base of the instrument, a camera-carrying element pivoted to said base in line concentrically with the pivot of the instrument, and a strut interposed between the said camera-carrying element of the support and the base, substantially as specified.

21. The combination of an optical instrument having a pivotal mounting, with a camera focused for parallel rays and movable as a rigid whole in the line of its optical axis, and a support for said camera comprising a base constructed to engage the base of the instrument, a camera-carrying element pivoted to said base in line concentrically with the pivot of the instrument, and a strut interposed between said camera-carrying element of the support and the base, substantially as specified.

22. The combination of an optical instrument having a pivotal mounting, with a camera movable in the line of its optical axis, and a support for said camera comprising a base constructed to engage the base of the instrument, a camera-carrying element pivoted to said base in line concentrically with the pivot of the instrument, and a pivoted strut interposed between the said camera-carrying element of the support and the base, substantially as specified.

23. The combination of an optical instrument having a pivotal mounting, with a camera focused for parallel rays and movable as a rigid whole in the line of its optical axis, and a support for said camera comprising a base constructed to engage the base of the instrument, a camera-carrying element pivoted to said base in line concentrically with the pivot of the instrument, and a pivoted strut interposed between the said camera-carrying element of the support and the base, substantially as specified.

24. The combination of an optical instrument having a pivotal mounting, with a camera movable in the line of its optical axis, a support for said camera, and pivotal mountings for said support located on opposite sides of the camera-mounting, and providing pivotal axes for the camera-support concentric with that of the instrument, substantially as specified.

25. The combination of an optical instrument having a pivotal mounting, with a camera focused for parallel rays and movable as a rigid whole in the line of its optical axis, a support for said camera, and pivotal mountings for said support located on opposite sides of the camera-mounting and providing pivotal axes for the camera-support concentric with that of the instrument, substantially as specified.

26. The combination of an optical instrument having pivotal mounting, with a camera movable in the line of its optical axis, and a support for said camera comprising a camera-carrying element and a base engaging the base of the instrument and having pivotal bearings for the camera-carrying element concentric with that of the instrument-mounting, said base also having an adjustable member for bearing upon the base of the instrument, substantially as specified.

27. The combination of an optical instrument having a pivotal mounting, with a camera movable in the line of its optical axis, and a support for said camera comprising a camera-carrying element and a base engaging the base of the instrument and having on opposite sides of the latter pivotal bearings for the camera-carrying element which bearings are concentric with that of the instrument-mounting, substantially as specified.

28. The combination of an optical instrument having a pivotal mounting, with a camera focused for parallel rays and movable as a rigid whole in the line of its optical axis, and a support for said camera comprising a camera-carrying element and a base engaging the base of the instrument and having on opposite sides of the latter pivotal bearings for the camera-carrying element, which bearings are concentric with that of the instrument-mounting, substantially as specified.

29. The combination of an optical instrument having pivotal mounting, with a camera movable in the line of its optical axis, and a support for said camera detachably mounted in pivotal bearings concentric with those of the instrument-mounting, substantially as specified.

30. The combination of an optical instrument having pivotal mounting, with a camera focused for parallel rays and movable as a rigid whole in the line of its optical axis, and a support for said camera detachably mounted in pivotal bearings concentric with those of the instrument-mounting, substantially as specified.

31. The combination of an optical instrument having pivotal mounting, with a camera movable in the line of its optical axis, and a support for said camera comprising a camera-carrying element and a base engaging the base of the instrument, said camera-carrying element being detachably mounted in pivotal bearings on said base, which bearings are concentric with that of the instrument-mounting, substantially as specified.

32. The combination of an optical instrument having pivotal mounting, with a camera movable in the line of its optical axis, and a support for said camera comprising the camera-carrying element, a base engaging the base of the instrument and having pivotal bearings for said camera-carrying element which are concentric with the axis of the instrument-mounting, a pivoted strut interposed between the base and said camera-carrying portion of the support, a spring for acting upon said strut and causing it to accommodate itself to the various angular adjustments of said camera-carrying element of the support, and means for locking said strut in its different positions of adjustment, substantially as specified.

33. The combination of an optical instrument having a pivotal mounting, with a camera movable in the line of its optical axis, and a support for said camera comprising a camera-carrying element, a base engaging the base of the instrument and having pivotal bearings for the camera-carrying element concentric with the axis of the instrument-mounting, a pivoted strut interposed between the base and the camera-carrying element of the support, and means for locking said strut in its different positions of adjustment, substantially as specified.

34. The combination of an optical instrument having a pivotal mounting, with a camera focused for parallel rays and movable as a rigid whole in the line of its optical axis, and a support for said camera comprising a camera-carrying element, a base engaging the base of the instrument and having pivotal bearings for the camera-carrying element concentric with the axis of the instruments, a pivoted strut interposed between the base and the camera-carrying element of the support, a spring for acting upon said strut and causing it to accommodate itself to the various angular adjustments of said camera-carrying element of the support, and means for locking said strut in its different positions of adjustment, substantially as specified.

In testimony whereof I have signed my name to this specification in the presence of two subscribing witnesses.

FREDERIC E. IVES.

Witnesses:
F. E. BECHTOLD,
FLORENCE HILLMAN.